( 12 ) United States Patent
Jose et al.

(10) Patent No.: US 11,121,874 B2
(45) Date of Patent: Sep. 14, 2021

(54) METHOD FOR ANALYZING DATA USING A BLOCKCHAIN, A DATA PROVIDER AND A DATA CUSTOMER THEREFOR

(71) Applicant: The University of Stavanger, Stavanger (NO)

(72) Inventors: Dhanya Therese Jose, Stavanger (NO); Antorweep Chakravorty, Stavanger (NO); Chunming Rong, Stavanger (NO)

(73) Assignee: The University of Stavanger, Stavanger (NO)

( * ) Notice: Subject to any disclaimer, the term of this patent is extended or adjusted under 35 U.S.C. 154(b) by 159 days.

(21) Appl. No.: 16/660,500

(22) Filed: Oct. 22, 2019

(65) Prior Publication Data
US 2021/0119796 A1    Apr. 22, 2021

(51) Int. Cl.
*G06F 7/04* (2006.01)
*H04L 9/32* (2006.01)
(Continued)

(52) U.S. Cl.
CPC .......... *H04L 9/3213* (2013.01); *G06F 9/3891* (2013.01); *G06F 16/907* (2019.01); *H04L 9/0643* (2013.01); *H04L 2209/38* (2013.01)

(58) Field of Classification Search
CPC . H04L 63/061; H04L 9/3213; H04L 12/1453; H04L 12/1417; H04L 9/32313;
(Continued)

(56) References Cited

U.S. PATENT DOCUMENTS

2018/0097779 A1* 4/2018 Karame .............. G06Q 20/065
2019/0179939 A1* 6/2019 Govindarajan ..... G06F 16/2445
(Continued)

OTHER PUBLICATIONS

Bruno Skvorc, May 24, 2018, Ethereum: How Transaction Costs are Calculated, pp. 1-7. (Year: 2018).*
(Continued)

*Primary Examiner* — Luu T Pham
*Assistant Examiner* — Jenise E Jackson
(74) *Attorney, Agent, or Firm* — Adsero IP

(57) ABSTRACT

A method for analyzing data using a blockchain, a data provider and a data customer therefor are disclosed. The method analyzing data using a blockchain is provided wherein a plurality of data sets is stored and processed in a data storage in a distributed manner using a cluster of nodes. The method comprises steps of deploying a smart contract to the blockchain according to a request from a data customer, receiving a request for executing code for data sets selected by a data customer, estimating an amount of token required for executing the code for the selected data sets in the data storage, and controlling, in said distributed manner using the cluster of nodes, execution of the code for the selected data sets based on the balance amount of token while the balance amount of token is greater than the estimated amount of token. The request for executing code includes code to be executed and a balance amount of token which the data customer currently has. The code to be executed includes a set of computational operations. The balance amount of token is updated after execution of each computational operation in said distributed manner. The amount of token represents number of units for an entity which controls computational complexity of the code requested by the data customer.

14 Claims, 8 Drawing Sheets

(51) Int. Cl.
  *G06F 16/907* (2019.01)
  *G06F 9/38* (2018.01)
  *H04L 9/06* (2006.01)
(58) Field of Classification Search
  CPC . H04L 9/0643; H04L 2209/38; G06F 9/3891;
       G06F 21/62; G06F 21/6245; H04W 12/06
  USPC ............................................................ 726/9
  See application file for complete search history.

(56) References Cited

U.S. PATENT DOCUMENTS

2019/0319808 A1* 10/2019 Fallah ........................ H04L 9/30
2019/0340607 A1* 11/2019 Lynn ..................... G06Q 20/389
2020/0027085 A1*  1/2020 Lee ...................... G06Q 20/401
2020/0184448 A1*  6/2020 Jain ........................ G06Q 20/40

OTHER PUBLICATIONS

Zuchowski, Nov. 14, 2017, Ethereum: Everything you want to know about Gas, pp. 1-8. (Year: 2017).*
Kasireddy, Sep. 13, 2017, How does Ethereum Work, Anyway?, pp. 1-27. (Year: 2017).*
Christidis et al, Blockchains and Smart Contracts for Internet of Things, IEEE, May 10, 2016, pp. 2292-2303. (Year: 2016).*
Pan et al, EdgeChain: An Edge-IoT Framework and Prototype Based on Blockchain and Smart Contracts, IEEE, Oct. 26, 2018, pp. 4719-4732. (Year: 2018).*

* cited by examiner

METHOD FOR ANALYZING DATA USING A BLOCKCHAIN, A DATA PROVIDER AND A DATA CUSTOMER THEREFOR

TECHNICAL FIELD

The present invention relates generally to the field of data analyzing in a data storage. The present invention relates specially to the field of a method for analyzing data using a blockchain, a data provider and a data customer therefor according to the preamble of the independent claim.

BACKGROUND

The world increasingly becomes driven by data. Needs to deal with a large scale of data and diverse data streams keep increasing exponentially. Accordingly, it gets a main issue how a large scale of data and diverse data streams can be analyzed in a secure manner and how the privacy for the data can be protected.

Conventional methods for analyzing data demand that the data to be analyzed should be moved across networks for analysis thereof. However, transferring such a large scale of data is highly demanding on networks. Moreover, many of data providers are reluctant to furnish their own data via networks for the reason of privacy and security issues. Therefore, there is a need for a new method for analyzing a large scale of data without transferring the data to be analyzed to an external network in order to guarantee the security and the privacy of the data.

Various blockchain technologies are introduced in order to guarantee the security of data. Blockchains can be defined as a chronological database of transactions grouped in a block and validated by a network of nodes, with multiple blocks added one after another in a chain. Blockchains can be also interpreted as an open distributed ledger, which records transactions efficiently. The transactions recorded in blockchain are tamperproof and transparent to all users in the network. It is a peer-to-peer communication between nodes, therefore no central node controls entire network. Each node individually verifies all transactions directly. Cryptographically secured hash functions are implemented to store transactions in the blockchain.

Blockchain can be classified into two types, namely permissioned and permissionless. The main differentiator is based on requirements for authorizing nodes in a network. Permissionless blockchains are public and allow anonymous users to participate and contribute their computational power. There are no restrictions in joining the network for the verification process. Bitcoin and Ethereum are examples of the public or permissionless blockchain. In permissioned or private blockchain, permission to join the network is restricted to users within an organization or group of organizations. Only the selected nodes by the blockchain consortium can participate in the verification process. Hyperledger Fabric and Ripple are examples for permissioned or private blockchain.

As blockchains are decentralized, when a transaction is proposed, its validity can be verified by any node in the network. These nodes add the transactions to a block and append it to the existing chain. However, there is a chance that more than one node can come up with a new block to append to the blockchain at the same time. In order to prevent this situation, an agreement should be made between the nodes about the node that is chosen to append a new block. This agreement is called the consensus algorithm which can be either proof based or voting based.

One of the biggest advantages of blockchain is smart contract. Blockchain based smart contracts can be any kind of program that will be executed in a distributed manner without any centralized third-party node. Each transaction in a blockchain will occur only if the conditions in the smart contracts are met. In public blockchain, as it is anonymous, there is a chance that anyone can deploy smart contracts which requires high computation. Particularly in Proof of Work consensus algorithm, as all users in the network participate in validation, if the smart contract requires high execution time or it contains an infinite loop, large delays to the network is inevitable. This kind of denial-of service attack, which is so called DOS attack, could incur a catastrophic situation to the whole network. Therefore, it is important to limit the complexity of computations in smart contracts.

Meanwhile, big data represents data sets that are very large to be efficiently interpreted, collected, managed and processed using traditional mechanisms. The growth of big data can be described by the primary characteristics of volume, velocity, variety and veracity. In term of volume the size of data has been grown exponentially by units of MB, GB, TB and PB. In term of velocity, the speed of data processing has been evolved from batch processing to periodic processing, and further to real time processing. In term of variety of data, the type of data has been developed variously from table, data base, photo, web, audio, social, video, mobile, to even unstructured data. Big data veracity refers to the quality of data such as biases, noises and abnormality in data. Big data analytics stands for the method of strategy of analyzing large volume of data. Some of the popular frameworks for big data analytics are Hadoop, Spark, MongoDB, Strom, Cassandra, Neo4j, etc. Each framework has its own advantages and disadvantages.

Thus, there is a need for a solution allowing an safer way for security and privacy issues and an more efficient way for handling large data and parallel computations.

As a prior art, US 2019/0050854 A1 discloses an example blockchain-based digital data exchanges including data publisher endpoint devices and data subscriber endpoint systems. In response to a request from a data subscriber endpoint system, initiate a transaction to provide a data subscriber endpoint system with access to the data by the blockchain network via the data mart publisher client. The prior art achieves some improvement of data protection using a blockchain, however, it still has some problem that the data itself moves from the storage to the data subscriber system via external network.

SUMMARY

It is an object of the proposed technology to meet the above described needs. It is also an object to provide an improved method for analyzing data using a blockchain, a data provider and a data customer therefor with improved protection of the security and the privacy of data according to the preamble of the independent claim.

In a first aspect of the proposed technology, the objects are achieved by a method for analyzing data using a blockchain wherein a plurality of data sets is stored and processed in a data storage in a distributed manner using a cluster of nodes. The method comprises steps of i) data provider deploying a smart contract to the blockchain, ii) receiving a request for executing code for data sets selected by a data customer, iii) estimating an amount of token required for executing the code for the selected data sets in the data storage, and iv) controlling, in said distributed manner using the cluster of nodes, execution of the code for the selected data sets based on the balance amount of token while the balance amount of token is greater than the estimated amount of token. The request for executing code includes code to be executed and a balance amount of token which the data customer currently has. The code to be executed includes a set of computational operations. The balance amount of token is updated after execution of each computational operation in said distributed manner. The amount of token represents number of units for an entity which controls computational complexity of the code requested by the data customer.

The step of controlling further comprises steps of executing each computational operation in the code for the selected data sets in said distributed manner, updating the balance amount of token by reducing an amount of token used after executing each computational operation in said distributed manner, and repeating the steps of executing and updating as long as the balance amount of token is enough for further execution of each computational operation based on the estimated amount of token and until getting a result of full execution of the code requested by the data customer. The cluster of nodes includes a master node and one or more slave nodes. The steps of execution and updating are performed in the one or more slave nodes in said distributed manner and the step of repeating is controlled in the master node in said distributed manner.

Before the step of deploying, the method further comprises publishing metadata of available data sets among the plurality of data sets stored in the data storage to the blockchain wherein the metadata includes information of identifying each data set in the data storage system without moving any data set from the data storage system to the data customer.

The step of estimating estimates an amount of token required for execution based on data type of each data set and code type of each computational operation to be executed. The step of estimating (S406) estimates the amount of token required for execution by looking up a token estimation table. The step of estimating includes comparing balance amount of token which the data customer currently has with the amount of token estimated for execution and controlling to allow or terminate execution of the code for the selected data sets based on result of comparison.

The step of controlling includes monitoring whether the balance amount of token which the data customer currently has is enough for executing each computational operation and controlling whether to continue execution of each computational operation or not. The step of controlling further comprises managing a total balance amount of token and reporting the total balance amount to the deployed smart contract after execution of each computational operation by a token manger in a master node and after execution of each computational operation, reducing each balance amount of token by each amount of token used in parallel by one or more token updaters in each slave node and reporting the each balance amount reduced to the token manager. The step of controlling further comprises reporting lack of amount of token to the data customer in case that the balance amount of token which the data customer currently has is not enough for executing each computational operation. The step of controlling further comprises reporting a result of execution to the data customer in case full execution of the code requested is completed.

In a second aspect of the proposed technology, the objects are achieved by a data provider using a blockchain which comprises a data storage system configured to store a plurality of data sets in a distributed manner using a cluster of nodes, a data processing system configured to process the plurality of data sets in a distributed manner using the cluster of nodes, a token control system configured to control processing of the data processing system based on a token in a distributed manner using the cluster of nodes and a blockchain application configured to deploy a smart contract to the blockchain. In a case that the deployed smart contract receives a request for executing code for certain data sets from a data customer, the deployed smart contract estimates amount of token required for executing the code for the certain data sets where the code to be executed includes a set of computational operations. The token control system controls, in a distributed manner using the cluster of nodes, execution of the code for the certain data set based on balance amount of token while the balance amount of token is greater than the estimated amount of token. The balance amount of token is updated after execution of each computational operation in a distributed manner.

The token control system controls the data processing system to execute each computational operation for the selected data sets in a distributed manner, and updates the balance amount of token by reducing amount of token used after execution of each computational operation in a distributed manner, and repeats the executing and the updating as long as the balance amount of token is enough for further execution of each computational operation based on the estimated amount of token and until getting a result of full execution of the code requested by the data customer.

The cluster of nodes includes a master node and one or more slave nodes. The executing and the updating are performed in the one or more slave nodes in a distributed manner and the repeating is controlled in the master node in a distributed manner.

The blockchain application publishes metadata of available data sets among the plurality of data sets stored in the data storage system to the blockchain. The metadata includes information of identifying each data set in the data storage without moving actual data set from the data storage system to the data customer.

The deployed smart contract responds to the request for execution from the data customer with access key thereto. The deployed smart contract also estimates amount of token required for execution based on data type of each data set and code type of each computational operation to be executed. The deployed smart contract estimates amount of token required for execution by looking up a token estimation table. The deployed smart contract compares balance amount of token which the data customer currently has with the amount of token estimated for execution and controls the data processing system to allow or terminate execution of the code for the selected data sets based on result of comparison.

The token control system monitors whether the balance amount of token which the data customer currently has is enough for executing each computational operation and controls whether to continue execution of each computational operation or not. The token control system comprises a token manager configured to manage total balance amount of token and report the total balance amount to the deployed smart contract after execution of each computational operation in a master node, and one or more token updaters configured to reduce each balance amount of token by each amount of token used in parallel in each slave node after execution of each computational operation; and reporting the each balance amount reduced to the token manager. The token manager reports lack of amount of token to the data customer in case that the balance amount of token which the data customer currently has is not enough for executing each computational operation. The token manager also reports a result of execution to the data customer in case full execution of the code requested is completed.

In a third aspect of the proposed technology, the objects are achieved by a data customer using a blockchain comprising a blockchain application configured to request for published metadata of available data sets among a plurality of data sets in a data storage system to the blockchain, and a token application configured to select certain data sets using the metadata of available data sets and request for executing code for the selected data sets with amount of token which the data customer currently has to a smart contract. The token application receives an access key from the smart contract and writes the code for the selected data sets. The code includes a set of computational operations. The metadata includes information of identifying each data set in the data storage system.

The data customer views only metadata of available data set, the available data sets which are stored in a data provider and sends the code to be executed to the data provider which has available data sets.

Technical Advantage

By the proposed technology, an effective framework which integrates the advantages of blockchain and big data, is provided for analyzing data in a large scale of data storage. A more efficient way for handling large data with parallel computing is provided. The security and the privacy of data is improved for the data provider which owns the data without sending the data itself to an external network rather receiving codes to be executed from the data customer. A controlled computation based on the computational complexity is provided for the data provider to prevent infinite loop, large delays to the network, or mal functions such DOS attacks.

BRIEF DESCRIPTION OF THE DRAWINGS

A more complete understanding of the above mentioned and other features and advantages of the present invention will be apparent from the following detailed description of the drawings, wherein.

Figure 1:
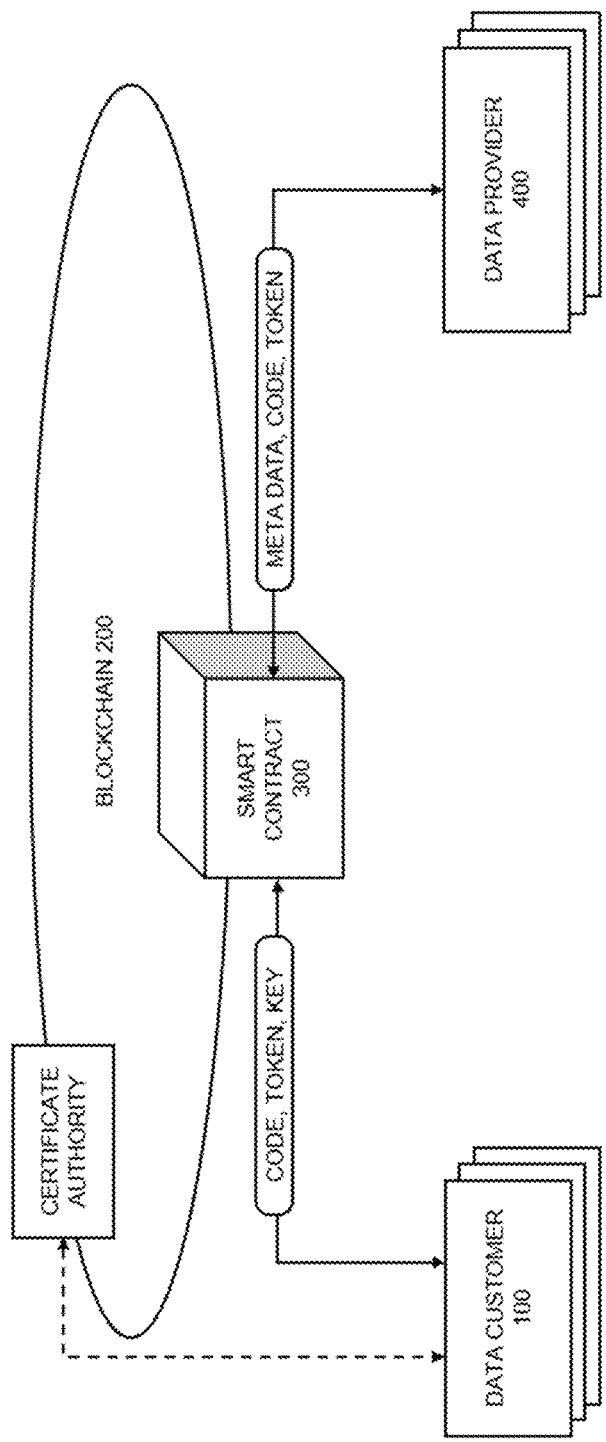
FIG. 1 schematically illustrates an example of data analyzing system using blockchain.

ITEM LIST 100 data customer
110 blockchain application of data customer
200 blockchain
300 smart contract
400 data provider
410 blockchain application of data provider
450 data processing system
470 data storage system
500 token control system
510 token manager
520, 540, 560 token updaters
600 token estimation table

DETAILED DESCRIPTION

A generalized embodiment is described below. It provides a solution for an improved method for analyzing data using a blockchain, a data provider and a data customer therefore with improved protection of the security and the privacy of data.

An aspect of our proposed approach is to move computational code to the data sets in a large scale of data storage, without transferring the data sets themselves to an external network. Conventional methods for analyzing data demands the data should be moved across networks for analysis. Along with it being highly network intensive, data owners for the data provider are also reluctant to provide their data due to security and privacy breaches.

Another aspect of our proposed approach is to utilize one of frameworks for big data which allows computation on large data sets through parallel computing in a distributed manner using a cluster of nodes.

The third aspect of our proposed approach is to adapt the blockchain to guarantees each transaction secured and tamperproof. Since conventional blockchain is limited to handling large data and parallel computation. Our proposed approach integrates blockchain into big data system in distributed way and complements them each other. Therefore, it provides new way of computing upon large data sets without the moving the data sets themselves across the network. By the proposed approach provides a solution to allow a safer way for improved protection of the security and the privacy of data and a more efficient way for handling large data and parallel computations.

The fourth aspect of our proposed approach is to provide a concept of a token for controlled computation, which prevents the execution of malicious functions in codes given by the data customer, by putting constraints of computational operation. Pre-defined token is assigned to the authorized data customer based on its needs for computation. Smart contract performs pre-checks on the code submitted by the data customer and an amount of token which the data customer currently has. The smart contract also estimates the amount of token required for executing the given code by the data customer. A token manager and token updaters are introduced to coordinate token value usage during computation of user code until it exits gracefully with normal result of full execution of the user code, or the assigned amount of token gets exhausted.

FIG. 1 schematically illustrates an example of data analyzing system using blockchain. The data analyzing system using block chain includes a data customer (100) and a data provider (400) in blockchain (200). A smart contract (300) is deployed by the data provider to the blockchain (200).

This embodiment has two core components. The first component is a data customer (100) which can view a metadata of available data sets in the data storage which is provided form the data provider through the smart contract and request permission for execution code for a set of computational operations on a selected data sets in the data storage. A metadata of available data sets includes information of identifying each data set in the data storage. Actual data set is not transferred to the data customer (100) but only the metadata of the actual data set is provided to the data customer (100) for selecting a set of data sets from the available data sets. Instead of transferring actual data set, the code to be executed can be transferred to the data provider (400).

The token represents an entity which can control computational complexity of the code requested by the data customer. The token can also control malicious functions of the code given by the data customer (100). Within a certain amount of token the code requested by the data customer can be executed in the data provider. Thereby prevents delays on the network. An amount of token required for executing code can be assigned to the data customer separately, which is out of scope of the present invention and not explained here in detail. During execution time, depending on the computational complexity of the code given by the data customer, a certain amount of token is reduced after each execution of the code. The execution of code will continue until it exits gracefully with a result of full execution or when the amount of token exhausts. The usage of token is monitored continuously by the data provider (400).

The request for executing code can includes code to be executed for the selected data set and the amount of token which the data customer (100) currently has. An access key may be provided by a data provider (400) through a smart contract (300) according to the request from the data customer (100).

The second component is a data provider (400) which can deploy a smart contract (300). The data provider provides access key for the deployed smart contract (300) to the data customer (100) if the data customer is authorized to a blockchain (200). The data customer (100) will submit the computational code that need to be executed on the selected dataset. If the data customer has enough amount of token in their account, the data provider can control the execution of the code on the actual data set which is maintained by the data provider (400).

The smart contract (200) which was deployed by the data provider (400) will perform a preliminary check of the code to be given from the data customer (100). The smart contract also can evaluate whether the amount of token provided by the data customer (100) satisfies the computational needs of the code provide by the data customer. The smart contract (300) control for the data provider (400) to execute the code within the amount of token the data customer currently has.

Figure 2:
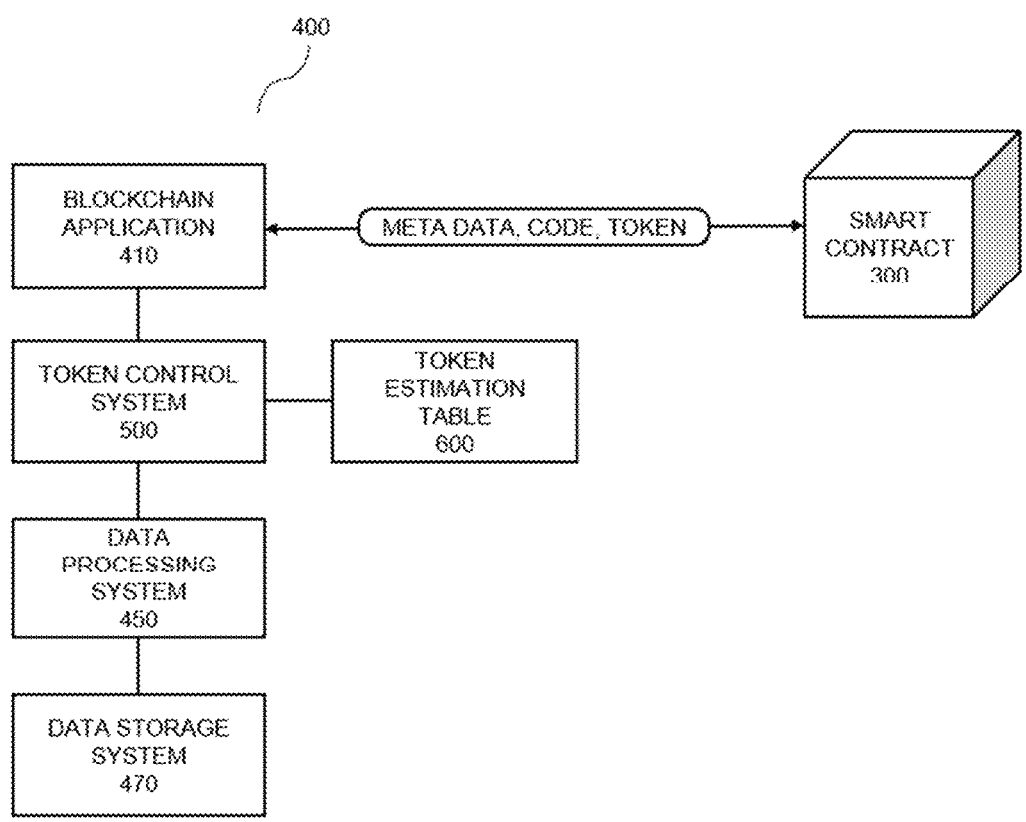
FIG. 2 illustrates a diagram of a data provider using blockchain.

FIG. 2 illustrates a diagram of a data provider using blockchain.

Referring to FIG. 2, the data provider (400) includes a data storage system (470), a data processing system (450), a token control system (500) and a blockchain application (410). The token estimation table (600) can be included in the data provider (400).

The data storage system (470) can store a plurality of data sets in a distributed manner using a cluster of nodes. The data processing system (450) can process the plurality of data sets in a distributed manner using the cluster of nodes. The token control system (500) can control processing of the data processing system based on an amount of token in a distributed manner using the cluster of nodes. The blockchain application (410) can deploy a smart contract (300) to the blockchain (200). In a case that the deployed smart contract (300) receives a request for executing code for certain data sets from a data customer (100), the deployed smart contract of the data provider (400) estimates amount of token required for executing the code for the certain data sets. The code to be executed includes a set of computational operations such as arithmetic, assignment, relational, or read operations.

The blockchain application (410) can publish a metadata of available data sets among the plurality of data sets stored in the data storage system (470) to the blockchain (200). The metadata includes information of identifying each data set in the data storage without moving actual data set from the data storage system to the data customer (100).

The token control system (500) can control, in a distributed manner using the cluster of nodes, execution of the code for the certain data set based on balance amount of token while the balance amount of token is greater than the estimated amount of token. The balance amount of token is updated after execution of each computational operation in a distributed manner.

The token control system (500) can control the data processing system (450) to execute each computational operation for the selected data sets in a distributed manner, and update the balance amount of token by reducing amount of token used depending on the computational complexity of the given code after execution of each computational operation in a distributed manner. The process of the executing and the updating of the data processing system (450) can be repeated as long as the balance amount of token is enough for further execution of each computational operation based on the estimated amount of token and until getting a result of full execution of the code requested by the data customer.

Figure 3:
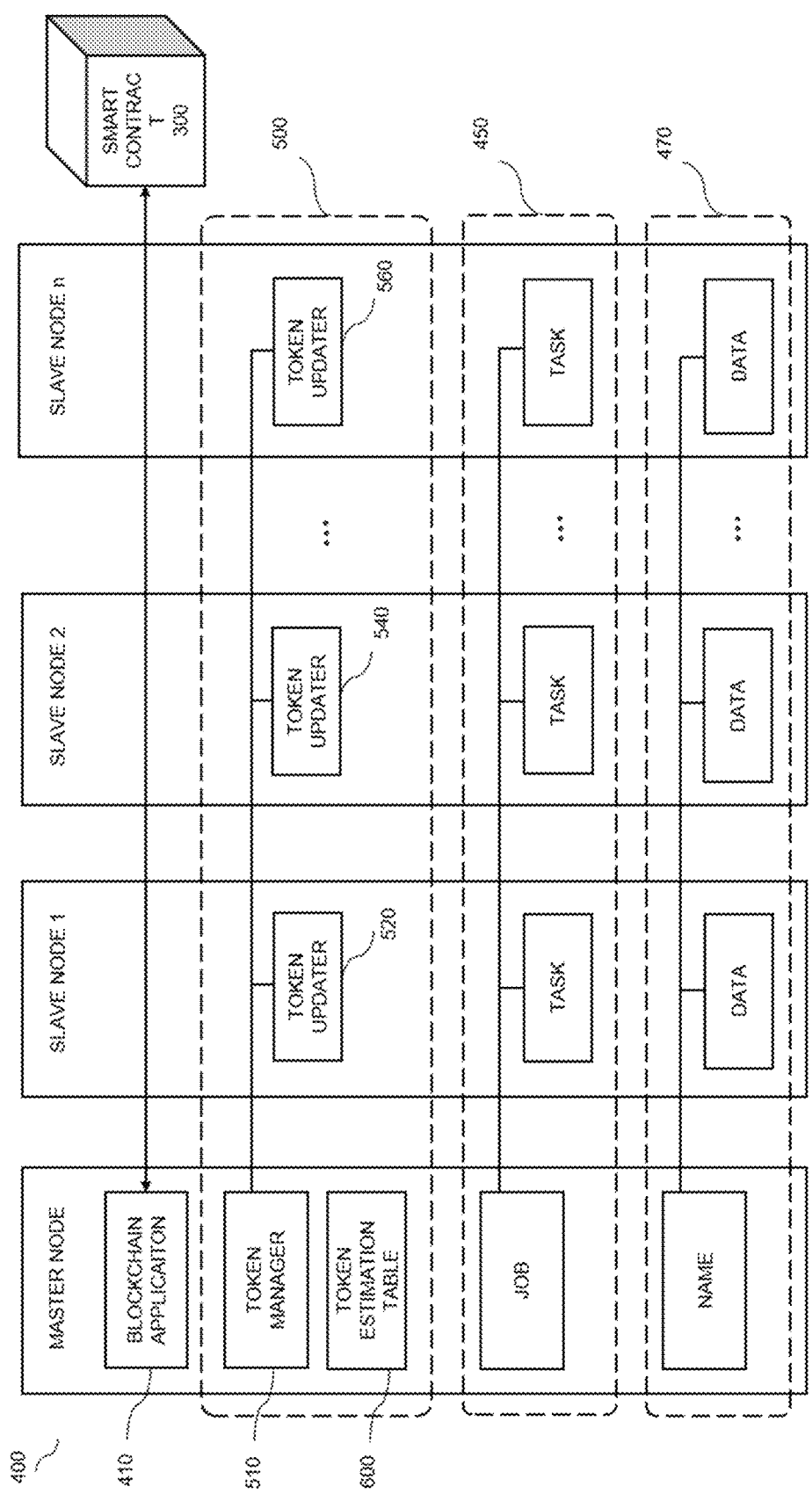
FIG. 3 shows an example embodiment of a data provider which is implemented in a distributed manner.

FIG. 3 shows an example embodiment of a data provider which is implemented in a distributed manner.

Referring to FIG. 3, the data provider (400) is comprised by a cluster of nodes which includes a master node (MASTER NODE) and one or more slave nodes (SLAVE NODE 1, 2, . . . , n). The executing and the updating are performed in the one or more slave nodes in a distributed manner and the repeating is controlled in the master node in a distributed manner. The data storage system (470), the data processing system (450) and the token control system (500) can have a master-slave structure which allows the data and the token be stored, processed and controlled in a distributed manner. Thereby a large scale of data can be handled efficiently.

The token control system (500) can monitor whether the balance amount of token which the data customer currently has is enough for executing each computational operation and control whether to continue execution of each computational operation or not.

The token control system (500) comprises a token manager (510) and one or more token updaters (520, 540, 560). The token manger (510) can manage total balance amount of token and report the total balance amount to the deployed smart contract (300) after execution of each computational operation in a master node. One or more updaters (520, 540, 560) can reduce each balance amount of token by each amount of token used for computational operation depending on the computational complexity in parallel in each slave node after execution of each computational operation and report the each balance amount reduced to the token manager (510). The token manager (510) can report lack of amount of token to the data customer (100) in case that the balance amount of token which the data customer currently has is not enough for executing each computational operation. The token manager (510) can also report a result of execution to the data customer (100) in case full execution of the code requested is completed.

Figure 4:
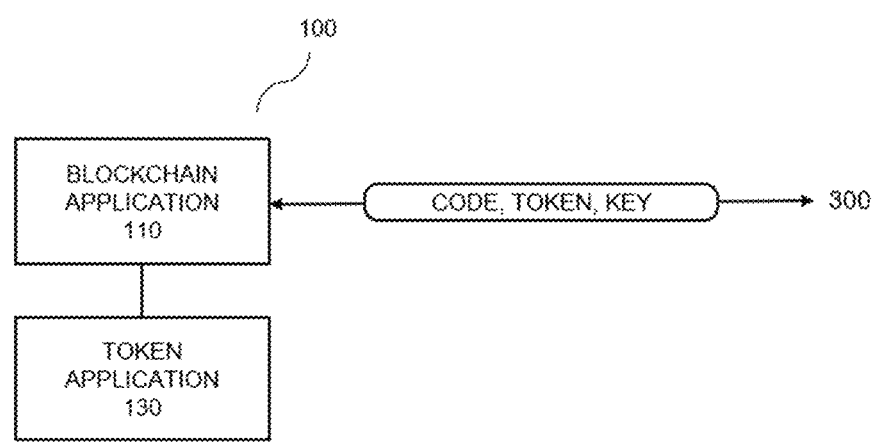
FIG. 4 illustrates a diagram of a data customer using blockchain.

FIG. 4 illustrates a diagram of a data customer using blockchain.

Referring FIG. 4, a data customer (100) includes a blockchain application (110) and a token application (130). The blockchain application (110) can request for a published metadata of available data sets among a plurality of data sets in a data storage system to the blockchain (200). The token application (130) can select certain data sets using the metadata of available data sets and request for executing code for the selected data sets with amount of token which the data customer (100) currently has to a smart contract (300). The token application (130) can receive an access key from the smart contract (300) and provide the code to be executed for the selected data sets into the smart contract (300). The code includes a set of computational operations. The metadata includes information of identifying each data set in the data storage system.

The data customer (100) can view only metadata of available data sets which are stored in a data provider (400) instead of receiving actual data set from the data provider (400). The data customer (100) can send rather the code to be executed to the data provider (400) which has available data sets through the smart contract (300). The data customer can also use a software development kit for the token application to create code for computation for example a MapReduce code and then that code will be evaluated in the smart contract for preliminary check of required token. Thereby the security and the privacy of data can be improved.

Figure 5:
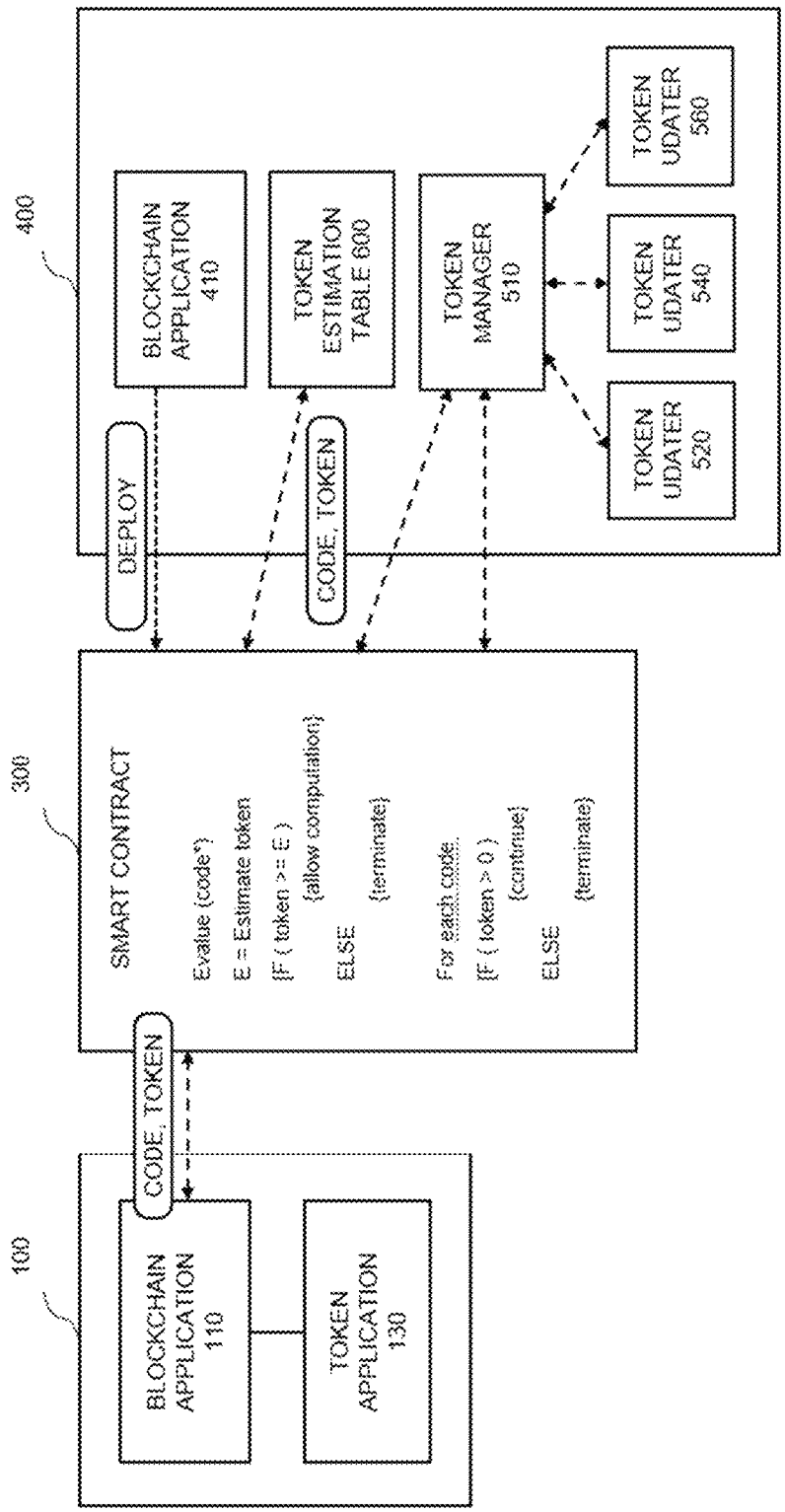
FIG. 5 shows an example embodiment of interaction between smart contract, data customer and data provider.

FIG. 5 shows an example embodiment of interaction between smart contract, data customer and data provider.

Referring FIG. 5, the deployed smart contract (300) can respond to the request for execution from the data customer (100) with access key thereto. The deployed smart contract (300) also estimates amount of token required for execution based on data type of each data set such as integer, double, date, etc. and code type of each computational operation to be executed such as arithmetic, assignment, relational, or read operations. The deployed smart contract (300) estimates amount of token required for execution by looking up a token estimation table (600).

The deployed smart contract (300) compares balance amount of token which the data customer (100) currently has with the amount of token estimated for execution and controls the data processing system (450) to allow or terminate execution of the code for the selected data sets based on result of comparison.

Furthermore, the deployed smart contract (300) can receive an updated balance amount of token after execution of each computational operation from the token manager (510) and controls the data processing system (450) to allow or terminate execution of the code.

The deployed smart contract (300) which is shown in FIG. 5 is merely an example of an embodiment and can be adapted or modified variously.

Figure 6:
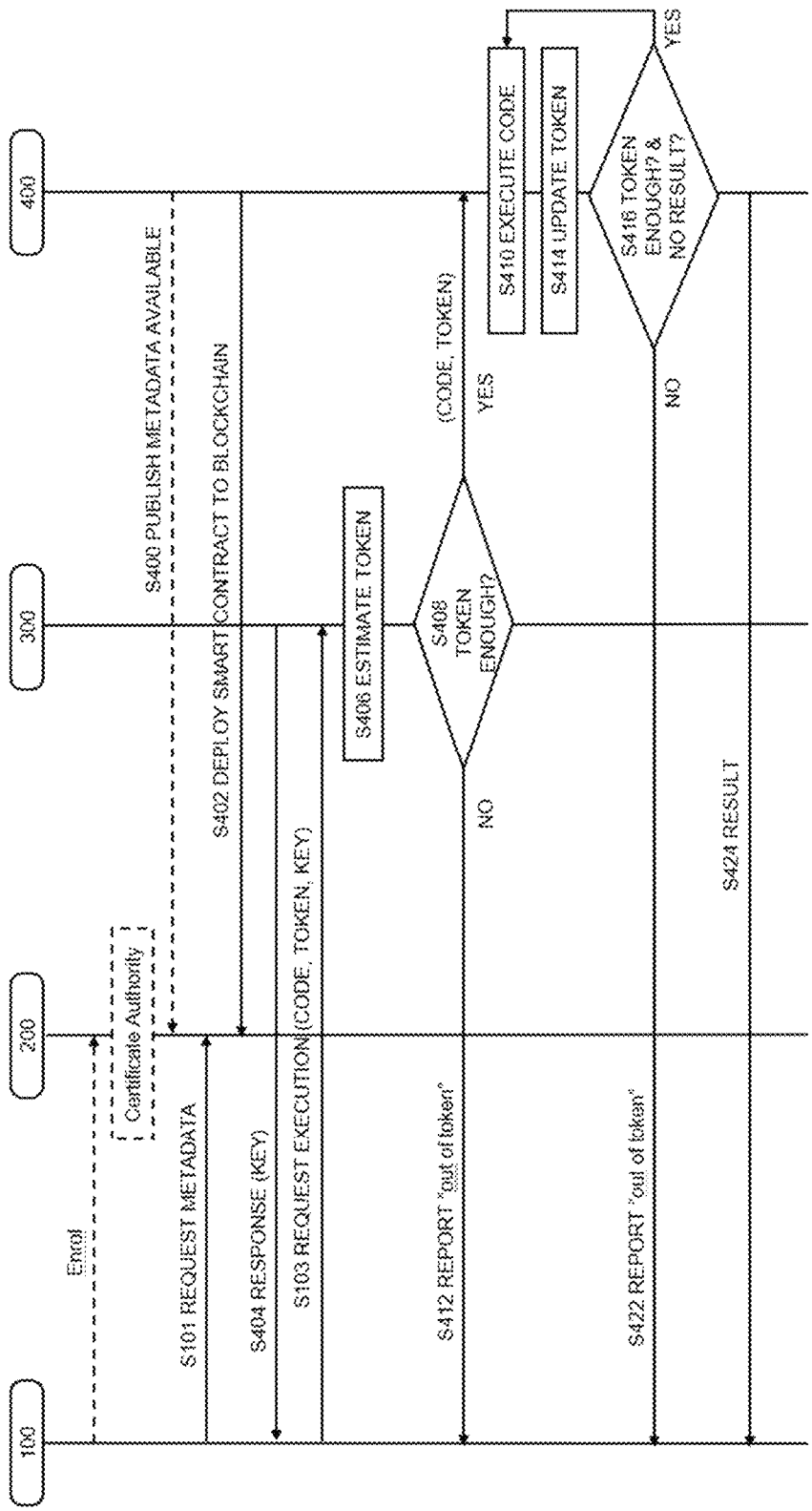
FIG. 6 shows an example embodiment of workflow of data provider, data customer, smart contract and blockchain.

FIG. 6 shows an example embodiment of workflow of data provider, data customer, smart contract and blockchain.

Referring FIG. 6, an authorized data customer (100) which can be an entity, or an organization can perform computation on an available data set using blockchain consortium. The data customer is authorized by registering or enrolling to the blockchain consortium. When the data customer (100) is authenticated, the data customer (100) can view and request (S101) the corresponding metadata of data sets in a data storage and computational operation facility provided by the data providers (400). Based on the meta data and the computational requirements of the data customer, the amount of token needs can be estimated later by the data provider (400). Depending on the network, the data customer (100) can acquire certain amount of token from the blockchain consortium (200). The data provider (400) can deploy a smart contract (300) to blockchain. If the request is valid, the data customer (100) will get a response (S404) which contains access key to the smart contract (300). The data customer can request for execution of code by providing the code to be executed on the selected data set along with the access key and the amount of token currently has. The smart contract which was deployed by the data provider can perform a preliminary check of the code given by the data customer. The smart contract can estimate (S406) the amount of token required for execution of the given code for the selected data set and evaluate (S408) whether the provided token satisfies the computational needs of the provided code. The smart contract can use a token estimation table to find the amount of token estimated. A detailed description of the token estimation table (600) is given in FIG. 8. If the amount of token available is greater than the amount of token estimated, the data provider (400) will allow the execution of the provided code on the provided data set. If the preliminary check passes, the actual computation will take place in a customized computational framework which consists of a token control system (500), a data storage system (470) and a data processing system (450) in a mater node and one or more slave nodes. The customized computational framework of token control system includes a token manager (510) and one or more token updaters (520, 540, 560). A detailed description of the customized computational framework of token control system is given in FIG. 8.

For each execution of a set of computational operations, the slave node will report the executed computational operation (S410) to the token updaters (520, 540, 560) in the slave node and in turn the token updaters send a response to the token manager in the master node. The token manager (510) will calculate (S414) the available balance amount of token based on the reports from all the updaters and send the updated balance amount of token back to all the updaters. When each token updater gets the response from the token manager and then sends a signal to each slave node for executing next set of computational operations. This process will be repeated until the execution of all the given code for computational operations is completed. Once a set of computational operations is executed in each slave node, the token updaters (520, 540, 560) in each slave nodes will update the balance amount of token to the token manager (510). Whenever the balance amount of token is not enough or less than the amount of token estimated for certain set of computational operations, the token manager (510) can immediately report (S412) an "out of token" status to the data customer through the smart contract and send a signal to the master node to immediately stop the whole execution. After the execution of each computational operations, the token manager (510) can send the amount of token used for that set of computational operations to the smart contract (300) in a blockchain network as a transaction. Then, the smart contract (300) which is already deployed in blockchain consortium will check whether the data customer (100) still has enough token for further execution of computational operations. If the data customer (100) has enough balance amount of token available, then control goes to the master node (510) to execute further computational operations. If the code required for executed on the selected data set finishes normally or the balance amount of token of the data customer is exhausted (S416), the corresponding result will be reported (S422 or S424) to the data customer (100) via blockchain.

Figure 7:
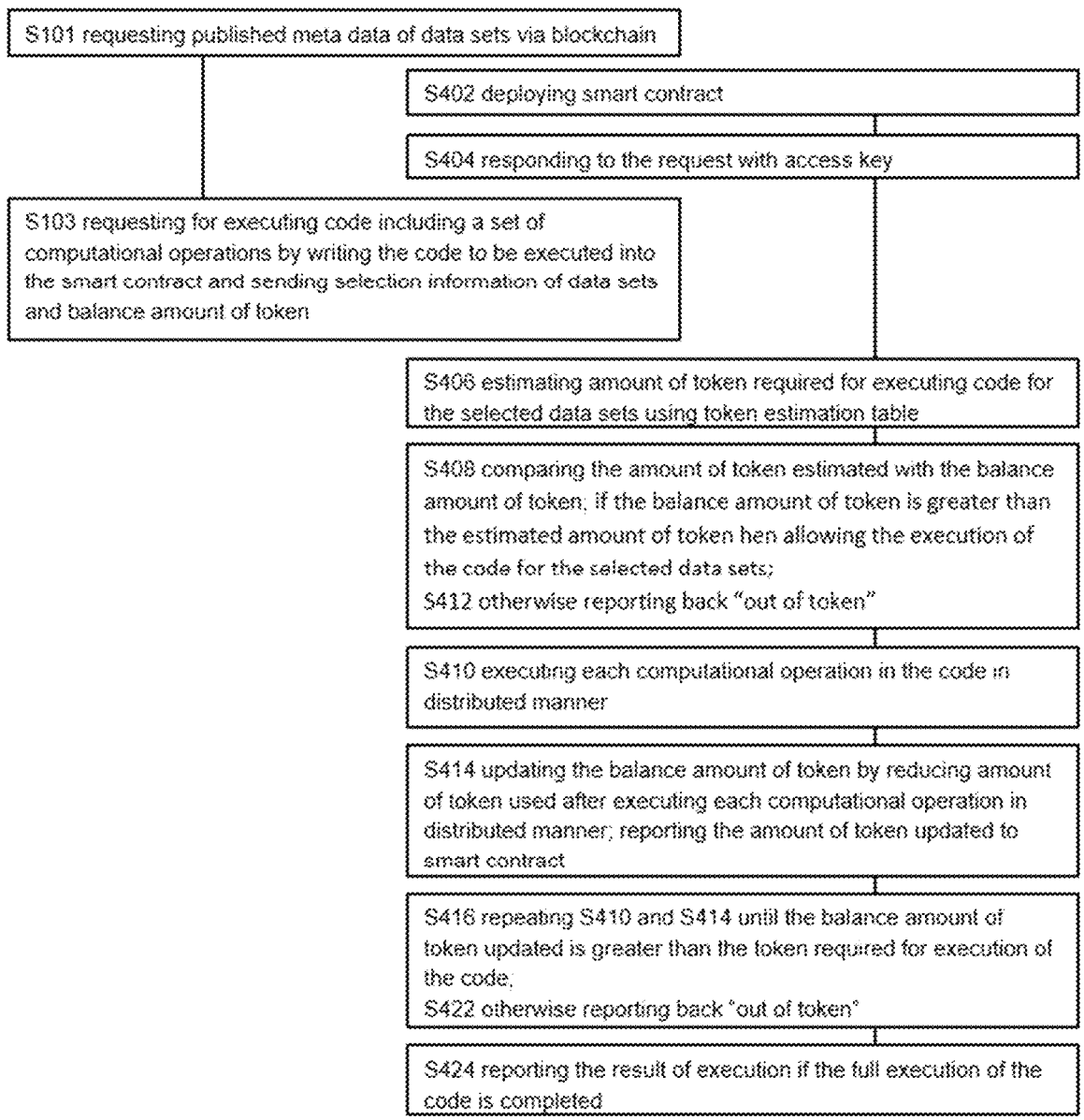
FIG. 7 illustrates the workflow for analyzing data using a blockchain.

FIG. 7 illustrates the workflow for analyzing data using a blockchain.

Referring FIGS. 6 and 7, the data customer (100) can enroll to the blockchain (200) and be authorized. The data provider (400) can publish metadata of available data set in the data storage to the blockchain.

The data customer (100) can request (S101) the published metadata of data sets to the blockchain. The metadata includes information of identifying each data set in the data storage system (470) without moving any actual data set from the data storage system (470) to the data customer (100).

The data provider (400) can deploy (S402) a smart contract (300) to the blockchain. According to the request for metadata from a data customer (100) it respond (S404) to the request with access key.

The data customer (100) can request (S103) for executing code including a set of computational operations by providing the code to be executed into the smart contract (300) and a balance amount of token which the data customer currently has. The data customer can further send selection information of data sets.

The data provider (400) can estimate (S406) an amount of token required for executing the code for the selected data sets in the data storage. The amount of token can be estimated and based on data type of each data set and code type of each computational operation to be executed. The token estimation table (600) can be looked up by the data provider for estimation. The detailed process of estimation will be described later with FIG. 8.

The data provider (400) can compare (S408) the estimated amount of token with the balance amount of token to control the execution of the code for the selected data sets based on the balance amount of token while the balance amount of token is greater than the estimated amount of token.

The data provider (400) can allow the execution of the code for the selected data sets if the balance amount of token is greater than the estimated amount of token. Otherwise the data provider (400) reports (S412) the status "out of token" to the data customer (100).

If the data provider allows the execution of the code, the data provider executes (S414) each computational operation included in the code in a distributed manner using a master node and one or more slave nodes.

Then the data provider can update (416) the balance amount of token by reducing amount of token used after executing each computational operation in a distributed manner. The data provider can also report the amount of token updated to smart contract (300).

The data provider can control (S416) to repeat the steps of executing (S410) and updating (S414) until the balance amount of token updated is greater than the token required for execution of the code in a distributed manner using a cluster of nodes. The cluster of nodes includes a master node and one or more slave nodes. The steps of execution (S410) and updating (S414) can be performed in the one or more slave nodes in said distributed manner and the step of repeating is controlled in the master node in said distributed manner as shown in FIGS. 3 and 4.

The step of controlling can further comprises managing a total balance amount of token and reporting the total balance amount to the deployed smart contract (300) after execution of each computational operation by a token manger (510) in a master node, and after execution of each computational operation, reducing each balance amount of token by each amount of token used in parallel by one or more token updaters (520, 540, 560) in each slave node and reporting the each balance amount reduced to the token manager (510). The step of controlling can further comprise reporting (S418) lack of amount of token to the data customer (100) in case that the balance amount of token which the data customer (100) currently has is not enough for executing each computational operation. The step of controlling further comprises reporting (S424) a result of execution to the data customer (100) in case full execution of the code requested is completed.

Figure 8:
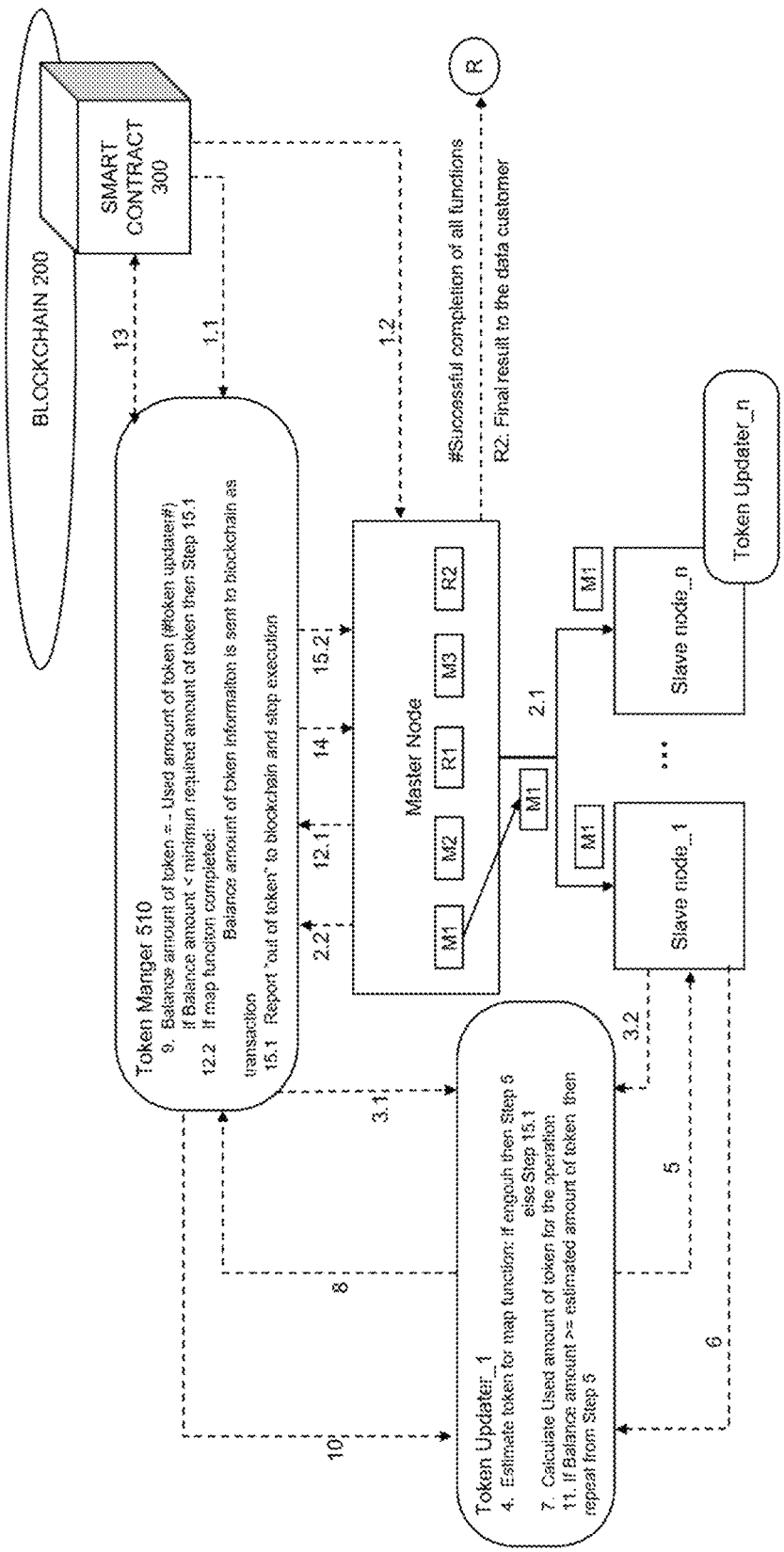
FIG. 8 shows an example embodiments of workflow for a token control system of the data provider in a distributed manner.

FIG. 8 shows an example embodiment of workflow for a token control system (500) of the data provider in a distributed manner.

Referring FIG. 8, the data provider (400) provides both a large scale of data sets by the data storage system (470) and a platform for computation of the code by the data processing system (450) and the token control system (500). The platform can be called as "Customized Computational Framework (CCF)". As shown in FIG. 3, in addition to the data storage system (470) and the data processing system (450) implemented in a distribute manner using a master node and a plurality of slave nodes, the token control system (500) including a token manager (510) and a plurality of token updaters (520, 540, 560) can be also implemented in a distributed manner using a master node and a plurality of slave nodes. Here the workflow of the token control system (500) which includes a token manager (510) and a plurality of token updaters (520, 540, 560) is described.

After the preliminary check for the estimation of token required for the execution of the code, the control goes to the CCF master node. The master node which is responsible to assign tasks for the plurality of slave nodes, start to send the required computational operations and data. As only an example of computational operations, map/reduce function will be used here for explanation, however, various type of computation operations can be used in a similar way.

Step 1.1

From blockchain an balance amount of token available and the estimated token required for executing the entire task will be given to the token manager (510). The token manger (510) is responsible to calculate the total used amount of the token after execution of each computational operations and give instruction to the master node whether to continue the execution further or not.

Step 1.2

Simultaneously the actual computation operation to be executed on the requested data set will be sent to the master node. In the workflow, the code contains three map functions M1, M2 and M3 and two reduce functions R1 and R2. These functions must be in a customized map-reduce format according to the present invention.

Step 2.1

The master node will give instruction to all the slave nodes to execute the first map function M1.

Step 2.2

Simultaneously the master node will inform the token manger (510) that the instruction to execute the first function is given to all slave nodes.

Step 3.1

The token manager (510) sends the available token information to all the token updaters (520, 540, 560).

Step 3.2

Each token updater (520, 540, 560) will have the information regarding the function to be executed, M1 and the data type of the requested data set from the respective slave node where each token updater is associated with.

Step 4

Each token updater (520, 540, 560) will estimate an amount of token required to execute the function M1 on the requested data set. If the balance amount of token available is enough for the estimated amount of token for M1, then go to step 5. Otherwise go to step 15.

Step 5

An instruction is sent to the corresponding slave node to start the execution of the function.

Step 6

A function contains a set of computational operations which need to be executed. the computational operators can include any type of operations such as arithmetic, logical, relational, assignment, bitwise, etc. After executing each computational operation, the slave node will inform the corresponding token updater.

Step 7

The updater will calculate the amount of token used for execution of the computational operation on the given data type.

Step 8

The amount of token used for current computational operation will be updated to the token manager (510).

Step 9

In the token manger, the token updaters update the amount of token used and calculate the balance amount of token currently available. If the balance amount of token currently available is not enough for further operation then the control goes to step 15, which is to stop the execution immediately.

Step 10

After the calculating the balance amount of token currently available, it will be reported to the token updaters.

Step 11

If the token updater receives the signal from the token manager, which indicates that there is enough amount of token for further execution, these updaters will again send a signal to the corresponding slave nodes to continue the execution. It then repeats step 5 to step 11 until the completion of that function or termination due to lack of balance amount of token.

Step 12.1

The master node signals the token manager that the execution of that particular function completed successfully.

Step 12.2

Simultaneously the token manager updates the blockchain with the balance amount of token currently available.

Step 13

While sending the available token as a transaction to the blockchain, the smart contract will double check if the token balance is empty or not. If the token balance is not empty, that is enough, the control goes back to token manager and continues from step 14. Otherwise data customer will get the information "Out of Token" and hence the connection is closed.

Step 14

Otherwise, it will signal the master node to release the next function in the code. It can be a map or a reduce function, for example M2 map function. Thus, the entire process will repeat from step 2.1 to step 13, the same as for the M1 function.

Step 15.1

When the available token is empty, the following two actions will be taken place simultaneously. The first is to send an update to blockchain with the information of "Out of Token".

Step 15.1

The second is to send a signal to master node to stop the entire execution immediately. If a final result from last reduce function, R2, is available, the result will be published to the data customer through the blockchain and the connection will be closed.

Token Estimation Table

Hereinafter, an example of token estimation table is disclosed and it is explained how to evaluate the estimated token required for executing the code.

Token is an entity which controls the computational complexity of the computational operation given by the data customer. There can be some standard token value for each type of computational operations to be performed. These values can be the same for all the data providers present in the blockchain consortium. The table which describes the token requirement for performing each computational operation is known as the Token Estimation Table. The smart contract (300), which is executed before the required computation, will evaluate an estimated amount of token according to the requested code by the data customer. For this estimation, the smart contract can use the information in the token estimation table. The amount of token required can be estimated based on the code type of various computational operations in the code and data types of the selected data sets. The estimation table can include all the supported computational operations on the data. For example, the computational operation of adding two values with "double integer" data type would require more amount of token compared to that of "integer" data type. The data type eventually shows the bytes required to store the data.

Hence, it can be represented as a function of operator and the number of bytes required. The set of computational operations is given as O: {o1, o2, o3, . . . oo}, which includes the operation of arithmetic, logical, relational, assignment, bitwise, etc. Each operator in O has a weightage, W: {w1, w2, w3, . . . wo} corresponding to the computational complexity, which is further used for token estimation. The set of supported data types is given as D: {d1, d2, d3, dd} and the corresponding bytes required for each data type as B: {b1, b2, b3, . . . bd}.

A general formula for estimating token required can be written as:

$$\text{Estimated amount of token} = \Sigma_{i=1 \text{ to } n} w(oi) \times b(di) \quad \text{[Equation 1]}$$

where, n represents the number of computational operations in the code, oi ∈ O and di ∈ D.

Smart Contract: Eval(Code*)

Eval(code*) on the smart contract performs a preliminary check to find the estimated amount of token required for the given code by the data customer. A sample calculation is shown below to demonstrate the actual execution of Eval (code*) according to the equation defined for estimated token. The data set in [Table 1] has three columns which contain the date, the customer id (C_id) with int data type and the bill amount (Bill) with the double data type.

TABLE 1

| Sample data set | | |
| --- | --- | --- |
| Data set | | |
| Date | C_id (int) | Bill (double) |
| 25 Feb. 2019 | 01 | 100 |
| 25 Feb. 2019 | 02 | 200 |
| 25 Feb. 2019 | 03 | 150 |
| 26 Feb. 2019 | 02 | 100 |

TABLE 1-continued

Sample data set
Data set

| Date | C_id (int) | Bill (double) |
|---|---|---|
| 26 Feb. 2019 | 03 | 50 |
| 27 Feb. 2019 | 02 | 100 |

The code in [Table 2] contains a map and reduce function. The reduce function should have the input as a (key, [value]) pair, key represents each unique C_id and value represents an array of all Bills corresponding to each C_id. Reduce function here is, to sum up, all elements in each array.

TABLE 2

Sample pseudo code

| Function | Pseudo code |
|---|---|
| Map | f( ) {find (this.C_id, this.Bill)} |

TABLE 2-continued

Sample pseudo code

| Function | Pseudo code |
|---|---|
| Reduce | f(key,values) |
|  | {array.sum(values)} |

The token estimation table is shown in [Table 3], which gives information regarding the weightage of each operator. It includes all the valid operators that can be used during execution. It also contains the number of bytes required for each data type.

TABLE 3

Sample Token estimation table
Totem Estimator Table

| Operator | | Datatype | |
|---|---|---|---|
| Operator | Weightage | Datatype | Bytes |
| Arithmetic: + | 2 | int | 4 |
| Assignment: # | 1 | double | 8 |
| Relational: # | 1 | date | 3 |
| Read | 1 | # | # |
| # | # | # | # |

The estimation determines the required token which is demonstrated in the Eval(Code*) table in [Table 4]. According to the example, map function will read each row in the data set, i.e., a total of 6 rows. The weightage of the read operator and the data types involved in a row determines the required token for that statement to execute. Then it will have each tuple as (C_id, Bill), that requires only read operations per row.

TABLE 4

Sample estimation
Eval(Code*)

| | n | Operator | $w(o_i)$ | Data type ($d_i$) | $b(d_i)$ | $w(o_i) * b(d_i)$ |
|---|---|---|---|---|---|---|
| Map function | | | | | | |
| 6 rows: Repeat (n = 1, 2, 3,) 6 times | 1 | Read a row | 1 | int, double, date | 3 + 4 + 8 | 15 |
| n = 1 to 6 | | | | | 6*15 | 90 |
| Reduce function | | | | | | |
| | 7 | Read first row | 1 | int, double | 4 + 8 | 12 |
| | 8 | Read second row | 1 | int, double | 4 + 3 * 8 | 28 |
| | 9, 10 | Arithmetic: '+' (three elements) | 2, 2 | double | 8, 8 | 32 |
| | 11 | Read third row | 1 | int, double | 4 + 2 * 8 | 20 |
| | 12 | Arithmetic: '+' (two elements) | 2 | double | 8 | 16 |
| n = 7 to12 | | | | | | 108 |

$\Sigma_{i=1 \text{ to } n} w(o_i) \times b(d_i) = 90 + 108 = 198$

The output of the map function will be sorted and shuffled in the data storage system (470). The input of reducer function will be a tuple (key, [value]) pair. Reading each input requires same effort as mentioned in the map function. After each read, the sum of Bills related to each C_id will be executed. C_id: 1 has only one Bill and thus no '+' operator required. C_id: 2 has three Bills and thus two '+' operator are required. Therefore, the required token will be twice the weightage of addition operation times bytes required to store the data type of Bill (double). Finally, C_id: 3 has only two bills, hence one '+' operator. The sum of required token for each operator mentioned here will give the total token required to execute the entire code* by the [Equation 1].

In summary, a set of embodiments might provide methods for analyzing data using a blockchain (200), wherein a plurality of data sets is stored and processed in a data storage in a distributed manner using a cluster of nodes. In an aspect, the method might comprise steps of: deploying (S402) a smart contract (300) to the blockchain by the data provider (400); receiving (S404, S103) a request for executing code for data sets selected by a data customer (100), wherein the request for executing code includes code to be executed and a balance amount of token which the data customer currently has, where the code to be executed includes a set of computational operations; estimating (S406) an amount of token required for executing the code for the selected data sets in the data storage; and controlling (S408), in said distributed manner using the cluster of nodes, execution of the code for the selected data sets based on the balance amount of token while the balance amount of token is greater than the estimated amount of token, wherein the balance amount of token is updated after execution of each computational operation in said distributed manner, wherein the amount of token represents number of units for an entity which controls computational complexity of the code requested by the data customer.

In some methods, the step of controlling (S408) further comprises steps of executing (S410) each computational operation in the code for the selected data sets in said distributed manner; updating (S414) the balance amount of token by reducing an amount of token used after executing each computational operation in said distributed manner; and repeating (S416) the steps of executing (S410) and updating (S414) as long as the balance amount of token is enough for further execution of each computational operation based on the estimated amount of token and until getting a result of full execution of the code requested by the data customer. Additionally and/or alternatively, the cluster of nodes includes a master node and one or more slave nodes and the steps of execution (S410) and updating (S414) are performed in the one or more slave nodes in said distributed manner and the step of repeating is controlled in the master node in said distributed manner.

In some methods, the method might further comprise, before the step of deploying (S402), publishing (S400) metadata of available data sets among the plurality of data sets stored in the data storage to the blockchain, wherein the metadata includes information of identifying each data set in the data storage system (470) without moving any data set from the data storage system (470) to the data customer (100).

In any of the methods described above, the step of estimating (S406) estimates an amount of token required for execution might be based on data type of each data set and code type of each computational operation to be executed. Alternatively and/or additionally, in any of these methods, the step of estimating (S406) estimates the amount of token required for execution by looking up a token estimation table, and/or the step of estimating (S406) includes comparing balance amount of token which the data customer (100) currently has with the amount of token estimated for execution; and controlling to allow or terminate execution of the code for the selected data sets based on result of comparison.

In any of the methods described above, the step of controlling can include monitoring whether the balance amount of token which the data customer (100) currently has is enough for executing each computational operation; and controlling whether to continue execution of each computational operation or not. In some methods, the step of controlling further comprises: managing a total balance amount of token and reporting the total balance amount to the deployed smart contract (300) after execution of each computational operation by a token manger (510) in a master node; and after execution of each computational operation, reducing each balance amount of token by each amount of token used in parallel by one or more token updaters (520, 540, 560) in each slave node and reporting each balance amount reduced to the token manager (510). In some methods, the step of controlling further comprises: reporting (S418) lack of amount of token to the data customer (100) in case that the balance amount of token which the data customer (100) currently has is not enough for executing each computational operation; and reporting (S424) a result of execution to the data customer (100) in case full execution of the code requested is completed.

Another set of embodiments provides data providers (400) using a blockchain (200) A data provider (400) might comprise a data storage system (470) configured to store a plurality of data sets in a distributed manner using a cluster of nodes; a data processing system (450) configured to process the plurality of data sets in a distributed manner using the cluster of nodes; a token control system (500) configured to control processing of the data processing system (450) based on a token in a distributed manner using the cluster of nodes; and a blockchain application (410) configure to deploy a smart contract (300) to the blockchain (200).

In a case that the deployed smart contract (300) receives a request for executing code for certain data sets from a data customer (100), the deployed smart contract (300) estimates amount of token required for executing the code for the certain data sets where the code to be executed includes a set of computational operations, wherein the token control system (500) controls, in a distributed manner using the cluster of nodes, execution of the code for the certain data set based on balance amount of token while the balance amount of token is greater than the estimated amount of token wherein the balance amount of token is updated after execution of each computational operation in a distributed manner.

In some data providers (400) the token control system (500) controls the data processing system (450) to execute each computational operation for the selected data sets in a distributed manner, and updates the balance amount of token by reducing amount of token used after execution of each computational operation in a distributed manner, and repeats the executing and the updating as long as the balance amount of token is enough for further execution of each computational operation based on the estimated amount of token and until getting a result of full execution of the code requested by the data customer. In some data providers, the token control system (500) might comprise a token manager (510) configured to manage total balance amount of token and report the total balance amount to the deployed smart contract (300) after execution of each computational operation in a master node; and one or more token updaters (520, 540, 560) configured to reduce each balance amount of token by each amount of token used in parallel in each slave node after execution of each computational operation; and reporting the each balance amount reduced to the token manager (510).

Another set of embodiments provides data customers (100). On such data customer (100) using a blockchain (200) might comprise a blockchain application (110) configured to request for published metadata of available data sets among a plurality of data sets in a data storage system (470) to the blockchain; and a token application (130) configured to select certain data sets using the metadata of available data sets and request for executing code for the selected data sets with amount of token which the data customer (100) currently has to a smart contract (300), wherein in case that the token application (130) receives an access key from the smart contract (300), the token application (120) writes the code for the selected data sets into the smart contract (300), and wherein the code includes a set of computational operations and the metadata includes information of identifying each data set in the data storage system (470). Some data customers (100) might view only metadata of available data set, the available data sets which are stored in a data provider (400), and sends the code to be executed to the data provider (400) which has available data sets.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for analyzing data using a blockchain, wherein a plurality of data sets is stored and processed in a data storage in a distributed manner using a cluster of nodes, the method comprising:
deploying a smart contract to the blockchain by a data provider, the smart contract associated with an access key configured to authorize access to the smart contract;
receiving a request for executing code from a data customer for data sets of the data provider selected by the data customer, wherein the request for executing code includes the code from the data customer to be executed by the cluster of nodes, the access key, and a balance amount of token which the data customer currently has, where the code to be executed includes a set of computational operations;
estimating an amount of token required for executing the code for selected data sets in the data storage; and
controlling, in said distributed manner using the cluster of nodes, execution of the code for the selected data sets based on the balance amount of token while the balance amount of token is greater than an estimated amount of token, wherein controlling execution of the code for the selected data sets further comprises monitoring whether the balance amount of token which the data customer currently has is enough for executing each computational operation and, based on the monitored balance amount of token, controlling whether to continue execution of each computational operation or not; and
managing the balance amount of token, wherein the balance amount of token is updated in said distributed manner after execution of each computational operation at each respective node of the cluster of nodes, wherein the balance amount of token is reduced by a respective amount of token used in parallel by each respective node of the cluster of nodes;
wherein the amount of token represents number of units for an entity which controls computational complexity of the code requested by the data customer.

2. The method of claim 1, wherein controlling further comprises:
executing each computational operation in the code for the selected data sets in said distributed manner;
updating the balance amount of token by reducing an amount of token used after executing each computational operation in said distributed manner; and
repeating executing and updating as long as the balance amount of token is enough for further execution of each computational operation based on the estimated amount of token and until getting a result of full execution of the code requested by the data customer.

3. The method of claim 2, wherein the cluster of nodes includes a master node and one or more slave nodes and, executing and updating are performed in the one or more slave nodes in said distributed manner and repeating is controlled in the master node in said distributed manner.

4. The method of claim 1, further comprising, before deploying:
publishing metadata of available data sets among the plurality of data sets stored in the data storage to the blockchain,
wherein the metadata includes information of identifying each data set in the data storage system without moving any data set from the data storage system to the data customer.

5. The method of any one of claim 1, wherein estimating estimates an amount of token required for execution based on data type of each data set and code type of each computational operation to be executed.

6. The method of claim 1, wherein estimating estimates the amount of token required for execution by looking up a token estimation table.

7. The method of claim 1, wherein estimating includes comparing balance amount of token which the data customer currently has with the amount of token estimated for execution; and controlling to allow or terminate execution of the code for the selected data sets based on result of comparison.

8. The method of claim 1, wherein controlling further comprises:
managing a total balance amount of token and reporting the total balance amount to the deployed smart contract after execution of each computational operation by a token manger in a master node; and
after execution of each computational operation, reducing each balance amount of token by each amount of token used in parallel by one or more token updaters in each slave node and reporting each balance amount reduced to the token manager.

9. The method of claim 1, wherein controlling further comprises:
reporting lack of amount of token to the data customer in case that the balance amount of token which the data customer currently has is not enough for executing each computational operation; and
reporting a result of execution to the data customer in case full execution of the code requested is completed.

10. A data provider system using a blockchain comprising:
a data storage system configured to store a plurality of data sets in a distributed manner using a cluster of nodes;
a data processing system configured to process the plurality of data sets in a distributed manner using the cluster of nodes;
a token control system configured to control processing of the data processing system based on a token in a distributed manner using the cluster of nodes; and
a blockchain application configure to deploy a smart contract to the blockchain, the smart contract associated with an access key configured to authorize access to the smart contract,
wherein, the data provider system is configured to receive a request for executing code from a data customer for data sets of the data provider selected by the data customer, wherein the request for executing code includes the code from the data customer to be executed by the cluster of nodes, the access key, and a balance amount of token which the data customer currently has, wherein the code to be executed includes a set of computational operations;

wherein, when the deployed smart contract is configured to receive the request for executing code from the data customer for certain data sets of a data provider, the deployed smart contract estimates amount of token required for executing the code for the certain data sets, wherein the token control system is configured to control, in a distributed manner using the cluster of nodes, execution of the code for the certain data set based on balance amount of token while the balance amount of token is greater than the estimated amount of token, wherein controlling execution of the code for selected data sets further comprises monitoring whether the balance amount of token which the data customer currently has is enough for executing each computational operation and, based on a monitored balance amount of token, controlling whether to continue execution of each computational operation or not, and wherein the token control system is configured to manage the balance amount of token, wherein the balance amount of token is updated in a distributed manner after execution of each computational operation at each respective node of the cluster of nodes, wherein the balance of amount of token is reduced by a respective amount of token used in parallel by each respective node of the cluster of nodes.

11. The data provider of claim 10, wherein the token control system is configured to control the data processing system to execute each computational operation for the selected data sets in a distributed manner, is configured to update the balance amount of token by reducing amount of token used after execution of each computational operation in a distributed manner, and is configured to repeat the executing and the updating as long as the balance amount of token is enough for further execution of each computational operation based on the estimated amount of token and until getting a result of full execution of the code requested by the data customer.

12. The data provider of claim 10, wherein the token control system comprises:
a token manager logic executable by the token control system configured to manage total balance amount of token and report the total balance amount to the deployed smart contract after execution of each computational operation in a master node; and
one or more token updater logic executable by the token control system to reduce each balance amount of token by each amount of token used in parallel in each slave node after execution of each computational operation; and reporting each balance amount reduced to the token manager.

13. A system comprising:
a data customer system using a blockchain comprising:
a blockchain application configured to request for published metadata of available data sets among a plurality of data sets of a data provider in a data storage system to the blockchain; and
a token application configured to select certain data sets using the metadata of available data sets and request for executing code for the selected data sets, the request including a balance amount of token which a data customer currently has, and an access key, to a smart contract; and a data provider system using the blockchain comprising:
the data storage system configured to store the plurality of data sets in a distributed manner using a cluster of nodes;
a data processing system configured to process the plurality of data sets in a distributed manner using the cluster of nodes;
a token control system configured to control processing of a data processing system based on token in a distributed manner using a cluster of nodes;
the blockchain application configured to deploy the smart contract to the blockchain;
wherein the smart contract is configured to associate with the access key, and the access key is configured to authorize access to the smart contract,
wherein in a case that the token application is configured to receive the access key from the smart contract, the token application writes the code for the selected data sets into the smart contract,
wherein the code includes a set of computational operations and the metadata includes information of identifying each data set in the data storage system,
wherein, the data provider system is configured to receive a request for executing code from the data customer for data sets of a data provider selected by the data customer, wherein the request for executing code includes the code from the data customer to be executed by the cluster of nodes, the access key, and the balance amount of token,
wherein, when the deployed smart contract is configured to receive the request for executing code from the data customer for certain data sets of the data provider, the deployed smart contract estimates an amount of token required for executing the code for the certain data sets,
wherein the token control system is configured to control, in a distributed manner using the cluster of nodes, execution of the code for the certain data set based on the balance amount of token while the balance amount of token is greater than the estimated amount of token, wherein controlling execution of the code for the selected data sets further comprises monitoring whether the balance amount of token which the data customer currently has is enough for executing each computational operation and, based on a monitored balance amount of token, controlling whether to continue execution of each computational operation or not, and
wherein the token control system is configured to manage the balance amount of token, wherein the balance amount of token is updated in a distributed manner after execution of each computational operation at each respective node of the cluster of nodes, wherein the balance of amount of token is reduced by a respective amount of token used in parallel by each respective node of the cluster of nodes.

14. The data customer system of claim 13,
wherein the data customer system is configured to view only metadata of available data set, the available data sets which are stored in a data provider, and sends the code to be executed to the data provider which has available data sets.

* * * * *